Figure 1:
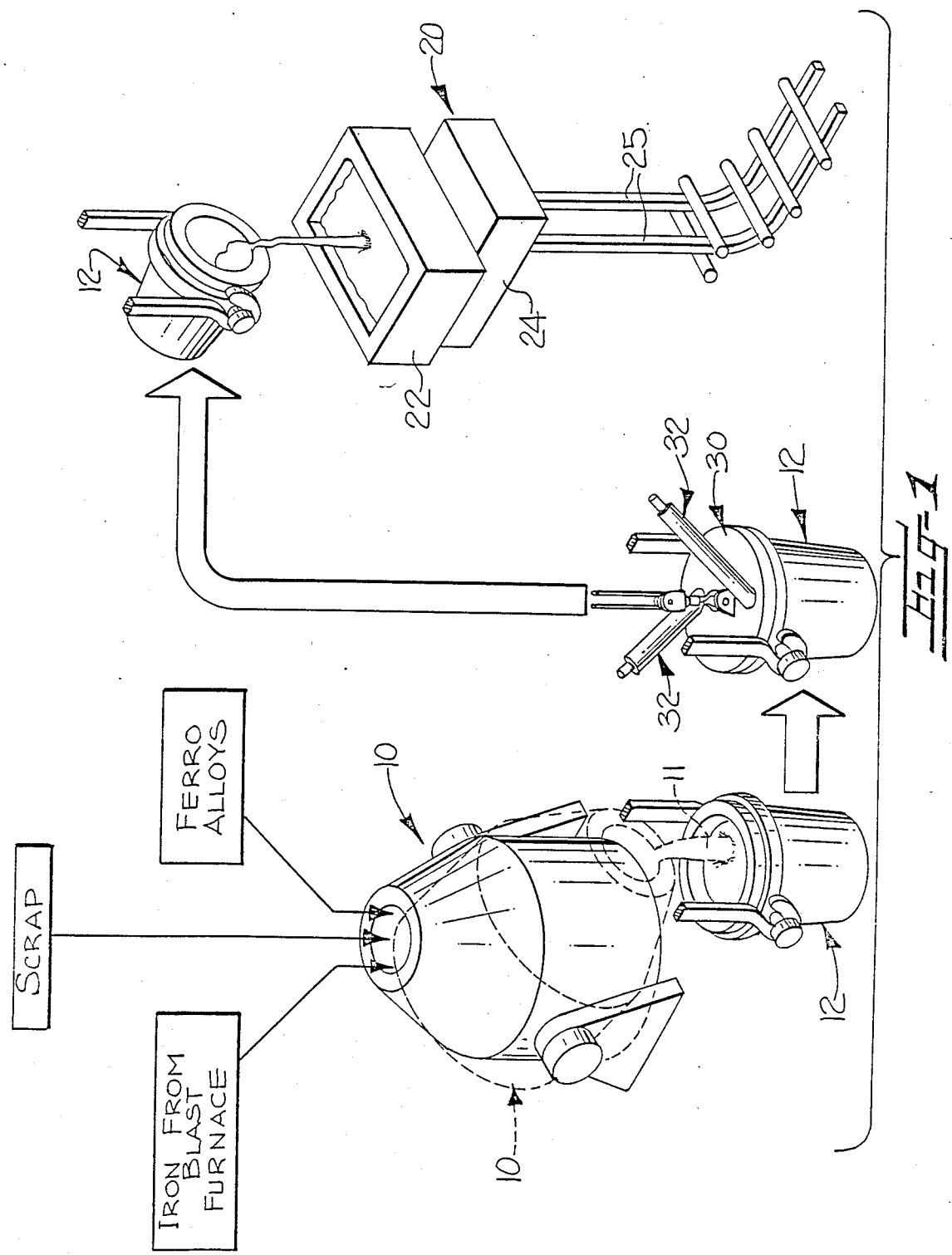

United States Patent [19]

Cheek

[11] Patent Number: 4,918,282
[45] Date of Patent: Apr. 17, 1990

[54] METHOD AND APPARATUS FOR HEATING MOLTEN STEEL UTILIZING A PLASMA ARC TORCH

[75] Inventor: David Cheek, Liberty, N.C.

[73] Assignee: Plasma Energy Corporation, Raleigh, N.C.

[21] Appl. No.: 112,688

[22] Filed: Oct. 23, 1987

Related U.S. Application Data

[62] Division of Ser. No. 817,907, Jan. 10, 1986, Pat. No. 4,734,551.

[51] Int. Cl.[4] ............................................. B23K 9/00
[52] U.S. Cl. .......................... 219/121.37; 219/121.36; 219/121.58; 373/18; 373/22; 75/10.19
[58] Field of Search ...... 219/121 P, 121 PR, 121 PQ, 219/121 PM, 121 PX, 121 PA, 121 PB, 121.58; 373/25, 18–22; 75/10.19, 10.22

[56] References Cited

U.S. PATENT DOCUMENTS

| | | |
|---|---|---|
| 2,828,516 | 4/1958 | Black et al. . |
| 3,015,554 | 1/1962 | Rummel . |
| 3,479,022 | 11/1969 | Coupette ............................. 393/22 |
| 3,496,280 | 2/1970 | Dukelow et al. . |
| 3,546,347 | 12/1970 | Hausig et al. . |
| 3,749,802 | 7/1973 | Camacho . |
| 3,749,803 | 7/1973 | Camacho . |
| 3,779,182 | 12/1973 | Camacho . |
| 3,819,840 | 6/1974 | Schultz . |
| 3,828,107 | 8/1974 | Sone ................................. 373/22 |
| 3,843,352 | 10/1974 | Ulrich . |
| 4,048,436 | 9/1977 | Hiratake et al. ................ 373/22 |
| 4,082,914 | 4/1978 | Bortnichuk et al. ............. 373/22 |
| 4,152,532 | 5/1979 | Eguchi et al. ................... 373/22 |
| 4,195,216 | 3/1980 | Beauchamp et al. . |
| 4,436,290 | 3/1984 | Kilches et al. . |
| 4,521,890 | 6/1985 | Burnham et al. ................ 373/22 |
| 4,559,439 | 12/1985 | Camacho et al. ........... 219/121 PR |
| 4,625,092 | 11/1986 | Camacho et al. . |
| 4,632,700 | 12/1986 | Bebber et al. . |

FOREIGN PATENT DOCUMENTS

| | | |
|---|---|---|
| 1288760 | 2/1969 | Fed. Rep. of Germany . |
| 2112509 | 7/1983 | United Kingdom . |

OTHER PUBLICATIONS

A 58-221220 Patent Abstracts of Japan, vol. 8, No. 67.
A 59-110741 Patent Abstracts of Japan, vol. 8, No. 225.

Primary Examiner—M. H. Paschall
Attorney, Agent, or Firm—Bell, Seltzer, Park & Gibson

[57] ABSTRACT

A method and apparatus for heating molten steel in a steel making operation is disclosed, and which includes a refractory lined vessel having an open top, a removable cover adapted to overlie the top, and at least one plasma arc torch mounted so as to extend through the cover at an angle of about 60°. The arc gas for the torch includes a substantial percentage of nitrogen, which permits a higher power level as compared to conventionally used argon, and the mass flow rate of the arc gas is maintained at a sufficiently high level to produce a continuous blast of gas which impinges at an angle upon any slag formed on the surface of the molten steel with sufficient force to move the slag and expose the underlying molten steel. As a result, the attachment of the arc to the underlying molten steel is facilitated, and the impingement of the gas contributes to the mixing of the steel to avoid heat stratification.

9 Claims, 2 Drawing Sheets

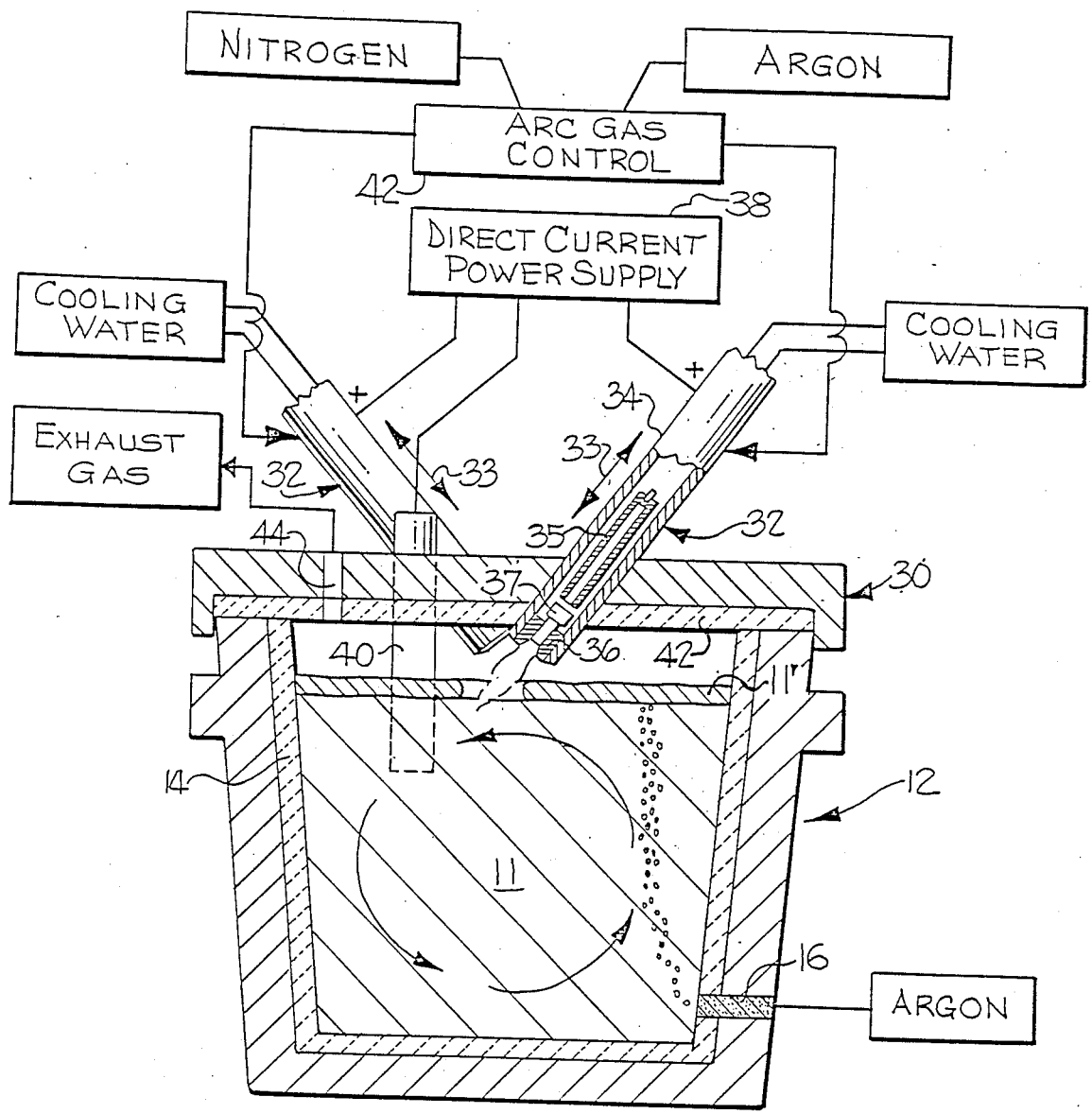
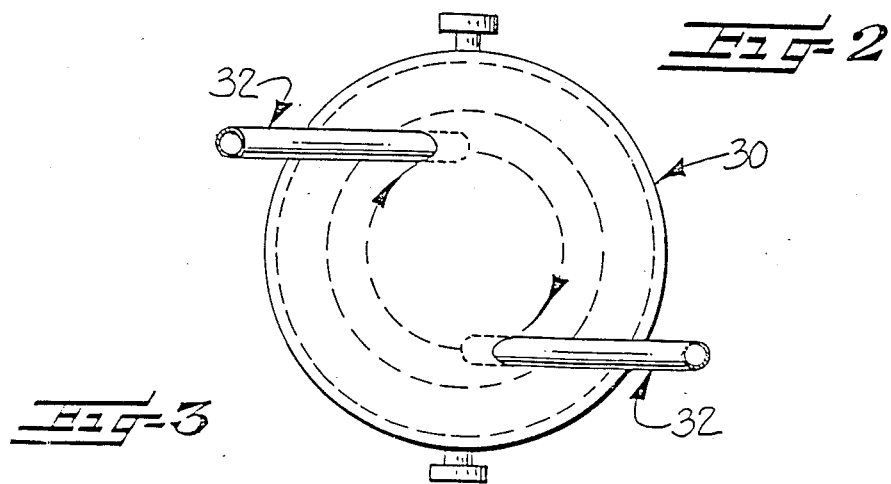
FIG-2
FIG-3

METHOD AND APPARATUS FOR HEATING MOLTEN STEEL UTILIZING A PLASMA ARC TORCH

This application is a division of application Ser. No. 817,907, filed Jan. 10, 1986 now U.S. Pat. No. 4,734,551.

The present invention relates to a method and apparatus for heating molten steel in a steel making operation, and which employs the use of a plasma arc torch.

In a conventional steel making operation, the iron is extracted from the ore in a blast furnace, and the resulting molten iron or "hot metal" is delivered from the furnace to a mixer, which serves as an accumulator. From the mixer, the hot metal is periodically delivered to the basic oxygen furnace where oxygen is blown through the metal, which raises its temperature by the exothermic reaction between carbon and the gaseous oxygen, and which also results in the impurities of the hot metal being oxidized and removed. When heating in the basic oxygen furnace is completed, the molten steel is poured into a preheated transfer ladle at a captive argon bubbling (CAB) station, where argon is bubbled up through the melt to facilitate mixing and where the final alloying and metallurgy tests take place. The transfer ladle is a very large refractory lined vessel, typically having a capacity on the order of 225 tons of steel.

Upon the final alloying being completed at the CAB station, the ladle is transported by a crane or the like to a continuous casting station, or to a teem ingot mold, for further processing. At the casting station, the steel is delivered from the ladle to a tundish, which in turn distributes the steel through apertures in its bottom to the continuous casting molds. A similar procedure is employed to fill the teem ingot molds with the steel.

A significant problem associated with the above conventional steel making process resides in the fact that the continuous casting station is subject to many operational breakdowns, which may cause it to stop functioning. When this happens, the ladles with the hot steel and which are on their way to the casting station, stand idle and rapidly lose temperature. If the temperature drops below a specified minimum temperature, the steel is no longer suitable for being processed in the caster, and the ladle is therefore returned and dumped into the basic oxygen furnace as liquid scrap. The resulting "abort" or "recycle" is quite expensive, since much of the cost of the initial processing of this metal is lost. While the problem of aborts is particularly applicable to the continuous casting operation, it also sometimes occurs where the steel is delivered to the teem ingot molds.

In an attempt to alleviate the "abort" problem, several steel mills have installed graphite electrode arc heaters to maintain the temperature of the steel in the ladles and possibly add superheat. In addition, several other steel mills have incorporated a separate abort saving station (or coupler), which acts as a reheating station between the CAB station and the caster. These present couplers also use a graphite electrode arc to heat the molten steel. However, these systems are not totally satisfactory, since the heat from the arc does not readily penetrate the molten steel and thus the heat stratifies within the ladle. Also, there is a metallurgical problem, in that the carbon from the graphite electrodes is released into the molten steel.

It has also been proposed to employ plasma arc torches in steel making furnaces of various types, note for example U.S. Pat. Nos. 3,496,280 and 3,749,803. Plasma torches of the type previously suggested for this use typically comprise a housing mounting a tungsten cathode at the rear end, with the forward end including a nozzle or collimator which is directed toward a pool of molten metal. An electrical arc is then struck between the cathode and the molten metal, with the molten metal serving as the anode. Also, an inert gas is forced through the nozzle in a vortical pattern, with the gas serving to collimate the arc and while being ionized by the arc and raised to a high temperature. However, such plasma arc torches have not heretofore been found to be suitable for use in heating the large ladles used in the steel making industry, by reason of the relatively low power capacity of such torches and the other problems noted below.

It is recognized in the plasma technology art that the power delivered by the torch depends in part upon the particular inert gas employed in the torch. Thus for example, it is known that argon, which is easy to ionize and thus has a relatively low electrical resistance, results in a relatively low operating voltage and power level. Nitrogen, which also has been used in plasma arc torches, is more difficult to ionize and has a higher operating voltage and thus a much higher power level. Hydrogen has also been proposed for use in plasma arc torches, and hydrogen has a still higher operating voltage and power level.

In spite of the above knowledge, the use of nitrogen and hydrogen in steel heating operations has not been considered feasible. In particular, it has been the belief of those skilled in the steel making art that the use of any nitrogen in the arc gas would be totally unsatisfactory, since the molten steel would absorb the nitrogen and thereby upset the highly sensitive metallurgical requirements of the resulting steel products. Hydrogen on the other hand is too expensive, and is hazardous to use in a steel making atmosphere. For these reasons, it is believed that all prior attempts to utilize plasma arc torches in steel making operations have employed argon as the arc gas, and these prior attempts have been largely unsuccessful because of the limited power capacity available when argon is employed.

A further difficulty associated with the use of plasma arc torches for heating molten steel, resides in the fact that a layer of slag inherently forms on the surface of the molten steel, and the slag is essentially electrically non-conductive. As a result, it has been difficult to establish the arc through the slag to the underlying melt.

It is accordingly an object of the present invention to provide a method and apparatus for heating molten steel which avoids the limitations and disadvantages of the prior systems as noted above, and which is particularly adapted for heating molten steel in the large transfer ladles of the type used in steel making operations and so as to avoid "aborts".

It is a more particular object of the present invention to provide a method and apparatus for heating, molten steel utilizing a plasma arc torch, with the torch being adapted to be operated at a power level sufficient to maintain or increase the temperature of the molten steel while the steel is held in a transfer ladle in a steel making operation.

It is a further object of the present invention to provide a method and apparatus for heating molten steel utilizing a plasma arc torch, which does not adversely effect the metallurgy of the molten steel, and which assists in the stirring of the molten steel so as to avoid heat stratification in the ladle.

It is still another object of the present invention to provide a method and apparatus for heating molten steel utilizing a plasma arc torch, and which includes provision for establishing and maintaining the arc through any slag formed on the surface of the molten steel.

These and other objects and advantages of the present invention are achieved in the embodiment illustrated herein by the provision of a method and apparatus which includes a steel heating apparatus which comprises a refractory lined vessel having an open top, a removable cover adapted to overlie the top, and at least one plasma arc torch mounted so as to extend through the cover. The torch includes a housing defining a forward end positioned on the under side of the cover, a rear electrode mounted within the housing, and gas vortex generating means for generating a vortical flow of gas which exits from the forward end of the torch. In operation, the vessel is substantially filled with the molten steel, and the cover is then placed so as to overlie the open top, with the forward end of the torch disposed in spaced relation above the surface of the molten steel in the vessel. The torch is then operated to produce a plasma arc having one end thereof attached to the rear electrode, and with the arc preferably extending to the molten steel. A gas which includes a substantial quantity of nitrogen is supplied to the gas vortex generating means such that the vortical flow of gas contains a substantial percentage of nitrogen and such that the torch may be operated at a relatively high power level. Surprisingly, it has been found that the presence of substantial quantities of nitrogen in the arc gas, and indeed up to 100% nitrogen, have had no deleterious effects on the metallurgy of the resulting steel, and no significant pick-up of the nitrogen has been detected.

As a further aspect of the present invention, a further inert gas, such as argon, may be concurrently supplied to the vortex generating means with the nitrogen, and while the relative percentages of nitrogen and the other gas are adjustably controlled so as to permit adjustment of the power level of the torch. Preferably, during normal operation, the percentage of nitrogen in the gas supplied to the gas vortex generating means is between about 80 to 100 percent.

As still another aspect of the present invention, the quantity of gas supplied to the vortex generating means is supplied at a relatively high mass flow rate which is sufficient to produce a continuous blast of gas from the forward end of the torch. Also, the torch is preferably mounted in the cover at an angle of between about 30° to 70° with respect to the surface of the cover, and the high gas flow rate acting in conjunction with the angular disposition of the torch causes the gas to impinge at an angle upon any slag on the surface of the molten steel, causing the slag to move and expose the underlying molten steel. This not only facilitates the attachment of the arc between the rear electrode and the underlying exposed molten steel, but also contributes to the mixing of the molten steel to thereby reduce heat stratification.

The present invention also involves a novel starting procedures for the torch, wherein a relatively large quantity of pressurized gas is supplied to the vortex generating means so as to produce an initial blast of gas from the forward end of the torch which impinges at an angle upon any slag on the surface of the molten steel to expose the underlying molten steel. Concurrently, there is established an electrical potential between the rear electrode and the molten steel in the vessel so as to cause the electrical arc to jump between the rear electrode and the exposed molten steel.

Some of the objects and advantages of the present invention having been stated, others will become apparent as the description proceeds, when considered in conjunction with the accompanying drawings, in which FIG. 1 is a schematic illustration of a portion of a steel making operation, and which incorporates the features of the present invention;

FIG. 2 is a sectional view of a steel transfer ladle and plasma arch torch in accordance with the present invention; and FIG. 3 is a partially schematic sectional view of a plasma arc torch suitable for use with the present invention.

Referring more particularly to the drawings, FIG. 1 illustrates a basic oxygen furnace 10, which is designed to receive molten iron from the blast furnace or an intermediate mixer or accumulator at a temperature of between about 2100° to 2400° F. In addition, metal scrap and various ferro alloys may be added to achieve the desired metallurgical composition. Oxygen is blown through the metal in the furnace, causing its temperature to rise to about 300° to 3100° F., which results in the impurities of the metal being oxidized and removed. When heating in the furnace is complete, the vessel is rotated or "turned down" as shown in dashed lines in FIG. 1 to deliver the molten steel 11 (or melt) to a preheated ladle 12 at the captive argon bubbling (CAB) station, where the final alloying and metallurgical tests take place. The ladle 12 is generally cylindrical and includes a refractory lining 14 and an open top, and typically has a capacity of about 225 tons of steel. Also, the ladle 12 may include a porous plug 16 adjacent the bottom of the ladle for the introduction of argon or other inert gas which bubbles up through the steel and which contributes to the mixing of the molten metal during final alloying as further described below.

Upon the final alloying being completed, the ladle 12 is transported by a crane or the like to continuous casting station 20, or to a teem ingot mold station (not shown) for further processing. At the casting station 20, the steel is delivered from the ladle 12 to a tundish 22, which in turn distributes the steel through apertures in its bottom to the continuous casting mold 24 which casts the ingots 25. Also, a cover 30 is placed over the open top of the filled ladle during transport between the oxygen furnace and the casting station to minimize heat loss.

In accordance with the illustrated embodiment of the present invention, two plasma arc torches 32 of like design are mounted in the cover 30 and so as to extend through the cover. When viewed in plan as seen in FIG. 3, the torches 32 are mounted approximately midway between the center and inside periphery of the ladle, on planes that are perpendicular to radial lines. The torches 32 also inclined in the circumferential direction at an angle of between about 30° to 70° with respect to the surface of the cover and the surface of the underlying melt. The most preferred angle is about 60°. In addition, each torch 32 is preferably mounted to the cover so as to permit the torch to be adjustably moved along its longitudinal axis in the direction of the arrows 33 so that the spacing between the forward end of the torch and the level of the melt may be adjusted. Further, when again viewed in plan, the two torches are disposed on opposite sides of the center of the ladle and they are oriented in opposite directions so as to be adapted to impart a common circular movement to the molten metal in the ladle, note FIG. 3.

The construction of each torch 32 is generally conventional, and as best seen in FIG. 2, each torch includes a tubular housing 34 which mounts a cup-shaped rear electrode 35, a nozzle 36 or collimator adjacent the forward end of the torch, and a gas vortex forming ring 37 disposed in the housing coaxially between the rear electrode and nozzle. A gas supply system is provided for supplying pressurized gas to the ring 37 such that a helical or vortical flow of gas is formed between the rear electrode 35 and nozzle 36 and which flows forwardly through the nozzle. The torch also includes a water cooling circulation system, and a DC power supply for 38 establishing an electrical potential between the rear electrode and the molten steel in the vessel, so as to cause an electrical arc to jump between the rear electrode and the molten steel, with the gas vortex serving to closely collimate the arc. As illustrated, the rear electrode 35 is the anode of the system, and a graphite electrode 40 extends through the cover and is immersed in the steel, so that the electrode 35 and molten steel serves as the cathode. Further constructional details of a torch of the described type may be obtained from prior U.S. Pat. No. 4,549,045, the disclosure of which is incorporated by reference.

As shown schematically in FIG. 2, the gas supply system includes a source of nitrogen, and a separate source of argon, together with an adjustable control 42 by which the percentage and amount of each gas delivered to the gas vortex forming ring 37 may be regulated. Thus it is possible to operate the torch using only nitrogen, or only argon, or any relative amounts of the two gases. By this arrangement, the power level of the torch may be effectively controlled by adjusting the percentage of nitrogen in the arc gas, with the power level increasing as the percentage of nitrogen increases.

A torch suitable for use with conventional steel transfer ladles having a capacity of about 225 tons, may have a power rating of about 3000 kw. Most conventional plasma torches of this size are designed to operate with a gas flow rate less than about 10 scfm, although higher flow rates have been previously tested in other specific applications. In accordance with the present invention however, the flow rate is significantly increased beyond the normal flow rates, for example to about 100 scfm for a 3000 kw torch, which has been found to provide several unexpected and significant advantages. Specifically, the relatively large quantity of pressurized gas which is introduced into the torch produces a continuous blast of gas from the forward end of the torch which tends to blow through any slag on the surface of the melt so as to expose the melt itself. Further, the high flow rate, in conjunction with the angled orientation of the torch, causes the blast of gas to impinge at an angle on the surface of the melt, which not only facilitates blowing through the slag to expose the melt, but also complements the effect of the argon bubbling to effect stirring of the melt itself, both downwardly as illustrated schematically in FIG. 2, and circularly as seen in FIG. 3. Thus the tendency of heat stratification within the melt is minimized. Still further, the high gas flow rate serves to closely collimate the arc, and it is believed that a high percentage of the radiant energy of the arc is absorbed by the gas and transferred by convection to the melt, rather than being radiated from the arc to the walls of the vessel and the cover.

The inside of the cover 30 is preferably lined with a refractory-material 42, which may for example comprise alumina fibers, refractory bricks, or a combination thereof. In addition, the cover mounts the graphite electrode 40 as noted above, and the cover also includes an exhaust port 44 to exhaust the gases from the interior of the ladle.

As noted above, it is common for slag to form on the surface of the melt as indicated at 11' in FIG. 2, and the presence of the slag renders the starting of the arc difficult, since the slag is relatively non-conductive. In accordance with a further aspect of the present invention, a starting procedure may be employed wherein the torch is initially held with its forward end a distance of about 18 inches above the slag, and the torch is initially started in a non-transfer mode wherein the arc extends between the rear electrode 35 and nozzle 36. A blast of arc gas is then introduced into the torch which results in the gas pushing the slag 11' to one side to expose the underlying melt, while also carrying the arc directly to the exposed melt. The flow rate of the gas may then be reduced to normal operating levels as described above.

In the drawings and specification, there has been set forth a preferred embodiment of the invention, and although specific terms are employed, they are used in a generic and descriptive sense only and not for purposes of limitation.

That which is claimed is:

1. An apparatus for heating a molten metal such as steel and comprising
   a vessel adapted to support molten metal such as steel and including an open top,
   at least two plasma arc torches mounted above said vessel, each said torch including a housing defining a forward end positioned adjacent the molten metal supported in said vessel, a rear electrode mounted within the housing, a tubular collimator mounted within said housing forwardly of and in coaxial alignment with said rear electrode, power supply means for generating an arc which extends from said rear electrode through said collimator and to the molten metal supported in said vessel, and vortex generating means for generating a vortical flow of gas at a location between said rear electrode and collimator and so that a vortical flow of gas exits forwardly through said collimator and substantially surrounds and collimates said arc, and with each of said at least two plasma torches being mounted approximately midway between the center and the inside periphery of the vessel and at circumferentially spaced locations with respect to the center of the vessel and also being mounted along a plane that is perpendicular to a radial line from the center of the vessel and at an angle of between about 30° to 70° with respect to the surface of the molten metal in the vessel, and with said torches being oriented in a common circumferential direction about the center of the vessel and such that the mass flow provided by said vortex generating means of said torches impinges at an angle upon the surface of the molten metal in said vessel and so as to impart a common circular movement to the molten metal in the vessel.

2. The apparatus as defined in claim 1 wherein said power supply means comprises an electrode mounted in said vessel so as to be adapted to contact and ground the molten metal, and a direct current power supply, with the anode thereof connected to the rear electrode of said torch and the cathode thereof connected to said electrode.

3. The apparatus as defined in claim 2 wherein said vortex generating means includes means for supplying a gas comprising at least about 80% nitrogen.

4. The apparatus as defined in claim 2 wherein said vortex generating means includes means for supplying nitrogen and another inert gas to said vortex generating means, and control means by which the relative percentages of nitrogen and the other inert gas may be adjusted.

5. The apparatus as defined in claim 1 wherein said apparatus further comprises a removable cover adapted to overlie said open top, and with said two plasma torches extending through said cover with the forward ends thereof being positioned on the under side of said cover.

6. The apparatus as defined in claim 5 wherein said power supply means includes an electrode mounted to extend through said cover so as to be adapted to contact and ground the molten metal.

7. The apparatus as defined in claim 5 wherein said vessel is refractory lined and has a generally cylindrical outline.

8. The apparatus as defined in claim 5 wherein said cover further includes an exhaust gas port whereby the gases introduced into the vessel by said torch may be exhausted.

9. The apparatus as defined in claim 5 wherein the surface of said cover which is adapted to directly overlie the open top of said vessel includes a refractory lining.

* * * * *